(12) United States Patent
Ji et al.

(10) Patent No.: US 8,345,984 B2
(45) Date of Patent: Jan. 1, 2013

(54) 3D CONVOLUTIONAL NEURAL NETWORKS FOR AUTOMATIC HUMAN ACTION RECOGNITION

(75) Inventors: Shuiwang Ji, Tempe, AZ (US); Wei Xu, Los Gatos, CA (US); Ming Yang, San Jose, CA (US); Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 385 days.

(21) Appl. No.: 12/814,328

(22) Filed: Jun. 11, 2010

(65) Prior Publication Data

US 2011/0182469 A1 Jul. 28, 2011

Related U.S. Application Data

(60) Provisional application No. 61/299,114, filed on Jan. 28, 2010.

(51) Int. Cl.
*G06K 9/00* (2006.01)
*G06K 9/62* (2006.01)
*G06K 9/64* (2006.01)

(52) U.S. Cl. ........ 382/190; 382/103; 382/155; 382/156; 382/279

(58) Field of Classification Search .................. 382/103, 382/154–160, 190, 191, 276, 279, 285
See application file for complete search history.

(56) References Cited

U.S. PATENT DOCUMENTS 6,529,614 B1 * 3/2003 Chao et al. ..................... 382/103
2005/0025355 A1 * 2/2005 Simard et al. ................. 382/159

OTHER PUBLICATIONS

Konrad Schindler, et al., Action Snippets: How many frames does human action recognition require?, Proceedings of IEEE Computer Vision and Pattern Recognition, 2008.
Ivan Laptev, et al., Retrieving Actions in Movies, Proceedings of IEEE Computer Vision and Pattern Recognition, 2008.
Piotr Dollar, et al., Behavior Recognition via Sparse Spatio-Temporal Features. (Available at: http://calit2-web03.ucsd.edu/smartvivarium/papers/cuboids05.pdf).
Christian Schuldt, et al., Recognizing Human Actions: A Local SVM Approach, Proceedings of the British Machine Vision Conference, 2006.
Svetlana Lazebnik, et al., Beyond Bags of Features: Spatial Pyramid Matching for Recognizing Natural Scene Categories, Proceedings of IEEE Computer Vision and Pattern Recognition, 2006.
Kai Yu, et al., Deep Learning with Kernel Regularization for Visual Recognition.

* cited by examiner

*Primary Examiner* — Brian Le
(74) *Attorney, Agent, or Firm* — Joseph Kolodka; Bao Tran

(57) ABSTRACT

Systems and methods are disclosed to recognize human action from one or more video frames by performing 3D convolutions to capture motion information encoded in multiple adjacent frames and extracting features from spatial and temporal dimensions therefrom; generating multiple channels of information from the video frames, combining information from all channels to obtain a feature representation for a 3D CNN model; and applying the 3D CNN model to recognize human actions.

18 Claims, 3 Drawing Sheets

3D CONVOLUTIONAL NEURAL NETWORKS FOR AUTOMATIC HUMAN ACTION RECOGNITION

This application claims priority to U.S. Provisional Application Ser. No. 61/299,114 filed Jan. 28, 2010, the content of which is incorporated by reference.

BACKGROUND

The present application relates to systems and methods for automatic human action recognition.

Recognizing human actions in real-world environment finds applications in a variety of domains including intelligent video surveillance, customer attributes, and shopping behavior analysis. However, accurate recognition of actions is a highly challenging task due to cluttered backgrounds, occlusions, and viewpoint variations, etc. Therefore, most of the existing approaches make certain assumptions (e.g., small scale and viewpoint changes) about the circumstances under which the video was taken. However, such assumptions seldom hold in real-world environment. In addition, most of these approaches follow the conventional paradigm of pattern recognition, which consists of two steps in which the first step computes complex handcrafted features from raw video frames and the second step learns classifiers based on the obtained features. In real-world scenarios, it is rarely known which features are important for the task at hand, since the choice of feature is highly problem-dependent. Especially for human action recognition, different action classes may appear dramatically different in terms of their appearances and motion patterns.

Deep learning models are a class of machines that can learn a hierarchy of features by building high-level features from low-level ones, thereby automating the process of feature construction. Such learning machines can be trained using either supervised or unsupervised approaches, and the resulting systems have been shown to yield competitive performance in visual object recognition, natural language processing, and audio classification tasks. The convolutional neural networks (CNNs) are a type of deep models in which trainable filters and local neighborhood pooling operations are applied alternatingly on the raw input images, resulting in a hierarchy of increasingly complex features. It has been shown that, when trained with appropriate regularization, CNNs can achieve superior performance on visual object recognition tasks without relying on handcrafted features. In addition, CNNs have been shown to be relatively insensitive to certain variations on the inputs.

In 2D CNNs, 2D convolution is performed at the convolutional layers to extract features from local neighborhood on feature maps in the previous layer. Then an additive bias is applied and the result is passed through a sigmoid function. Formally, the value of unit at position (x,y) in the j th feature map in the i th layer, denoted as $v_{ij}^{xy}$, is given by $$v_{ij}^{xy} = \tanh\left(b_{ij} + \sum_m \sum_{p=0}^{P_i-1} \sum_{q=0}^{Q_i-1} w_{ijm}^{pq} v_{(i-1)m}^{(x+p)(y+q)}\right), \quad (1)$$

where tanh (•) is the hyperbolic tangent function, $b_{ij}$ is the bias for this feature map, m indexes over the set of feature maps in the (i−1) th layer connected to the current feature map, $w_{ijk}^{pq}$ is the value at the position (p,q) of the kernel connected to the k th feature map, and $P_i$ and $Q_i$ are the height and width of the kernel, respectively. In the subsampling layers, the resolution of the feature maps is reduced by pooling over local neighborhood on the feature maps in the previous layer, thereby increasing invariance to distortions on the inputs. A CNN architecture can be constructed by stacking multiple layers of convolution and subsampling in an alternating fashion. The parameters of CNN, such as the bias $b_{ij}$ and the kernel weight $w_{ijk}^{pq}$, are usually trained using either supervised or unsupervised approaches.

SUMMARY

In one aspect, systems and methods are disclosed to recognize human action from one or more video frames by performing 3D convolutions to capture motion information encoded in multiple adjacent frames and extracting features from spatial and temporal dimensions therefrom; generating multiple channels of information from the video frames, combining information from all channels to obtain a feature representation for a 3D CNN model; and applying the 3D CNN model to recognize human actions.

Implementations of the above aspect can include one or more of the following. A human detector can process the video frames. A human tracker can also process the video frames. The system can generate multi-frame cubes from tracked humans. The multiple frames cubes are obtained by extracting bounding boxes at a predetermined position from consecutive frames before and after a current frame, leading to a cube containing an action. The 3D CNN can include a hardwired layer, convolution layers, subsampling layers, and a full connection layer. The hardwired layer can have kernels to generate the multiple channels of information from the video frame with feature maps in gray, horizontal gradient, vertical gradient, and optical flow gradients along horizontal and vertical directions, computed from adjacent video frames. The system can generate a feature vector capturing motion information in the input frames. A linear classifier can be applied to the feature vector for action classification. The 3D CNN can determine a value v at position (x,y,z) on a j th feature map in an i th layer as:

$$v_{ij}^{xyz} = \tanh\left(b_{ij} + \sum_m \sum_{p=0}^{P_i-1} \sum_{q=0}^{Q_i-1} \sum_{r=0}^{R_i-1} w_{ijm}^{pqr} v_{(i-1)m}^{(x+p)(y+q)(z+r)}\right),$$

where tanh (•) is the hyperbolic tangent function, $P_i$ and $Q_i$ are height and width of a 3D kernel, R is the size of the 3D kernel along a temporal dimension, $w_{ijm}^{pqr}$ the (p,q,r) th value of the kernel connected to the m th feature map in a previous layer, and $b_{ij}$ is a feature map bias.

Advantages of the preferred embodiments may include one or more of the following. The system applies deep learning of CNNs to 3D video for human action recognition in a real-world environment. The system accurately recognizes human actions involving articulated body motion such as pointing, putting objects, placing telephones to the ear from surveillance videos. No manual feature selection is needed. The method is general and easy to apply to different action categories. The system is fast in processing and has a robust performance with a regular processing flow.

DESCRIPTION

Figure 1:
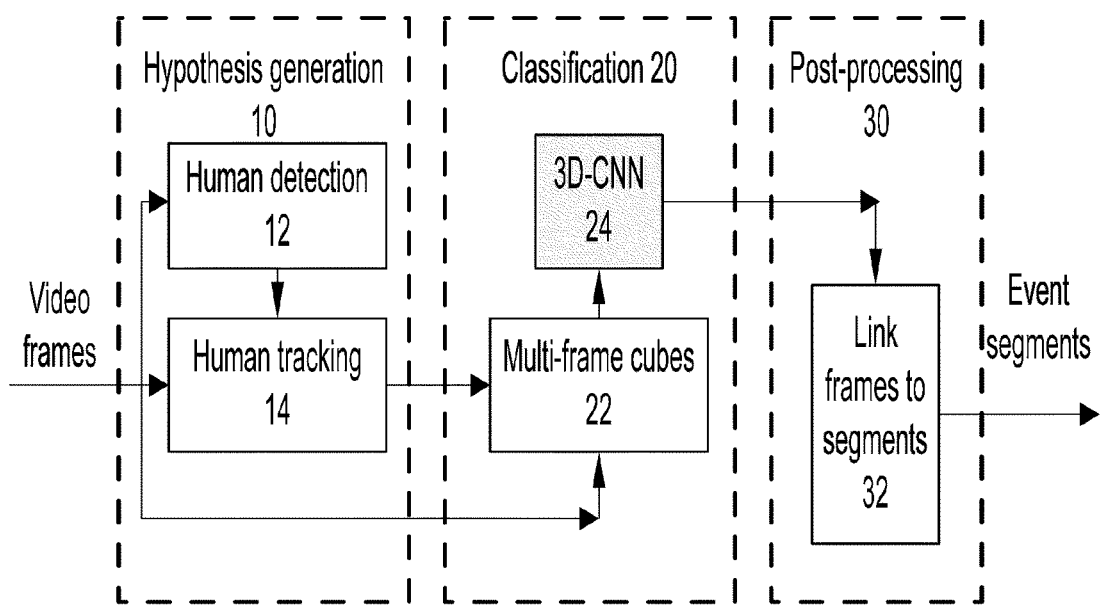
FIG. 1 shows an exemplary system diagram for an action recognition system.

FIG. 1 shows an exemplary system diagram for an action recognition system. The system includes a hypothesis generation engine 10 that receives video frames from a camera (not shown). The output of the hypothesis generation engine is provided to a classification engine 20, and the classification ouptut is provided to a post-processing engine 30. The video frames are provided to a human detector 12 and a human tracker 14. The output of block 14 and the input video frames are provided to multi-frame cubes 22, which communicates with a 3D-CNN 24. The output of the 3D-CNN 24 is provided to a block 32 in the post processing engine 30 that links frames to segments. The result are event segments indication recognized human actions.

To effectively incorporate the motion information in video analysis, 3D convolution is done in the convolutional layers of CNNs so that discriminative features along spatial and temporal dimensions are captured. By applying multiple distinct convolutional operations at the same location on the input, multiple types of features can be extracted. In one embodiment, the 3D CNN architecture generates multiple channels of information from adjacent video frames and performs convolution and subsampling separately in each channel. The final feature representation is obtained by combining information from all channels. An additional advantage of the CNN-based models is that the recognition phase is very efficient due to their feed-forward nature.

The 3D-CNN 24 captures the motion information encoded in multiple contiguous frames. 3D convolutions are performed in the convolution stages of CNNs to compute features from both spatial and temporal dimensions. The 3D convolution is achieved by convolving a 3D kernel to the cube formed by stacking multiple contiguous frames together. By this construction, the feature maps in the convolution layer is connected to multiple contiguous frames in the previous layer, thereby capturing motion information. Formally, the value at position (x,y,z) on the j th feature map in the i th layer is given by $$v_{ij}^{xyz} = \tanh\left(b_{ij} + \sum_{m}\sum_{p=0}^{P_i-1}\sum_{q=0}^{Q_i-1}\sum_{r=0}^{R_i-1} w_{ijm}^{pqr} v_{(i-1)m}^{(x+p)(y+q)(z+r)}\right), \quad (2)$$

where $R_i$ is the size of the 3D kernel along the temporal dimension, $w_{ijm}^{pqr}$ is the (p,q,r) th value of the kernel connected to the m th feature map in the previous layer.

As each frame contains multiple humans, the human detector 12 and the detection-driven tracker 14 are used to locate human heads. Based on the detection and tracking results, a bounding box for each human that performs action is computed. The multiple frames required by 3D CNN model are obtained by extracting bounding boxes at the same position from consecutive frames before and after the current frame, leading to a cube containing the action. The temporal dimension of the cube is set to 7 in one implementation as it has been shown that 5-7 frames are enough to achieve a performance similar to the one obtainable with the entire video sequence. The frames were extracted with a step size of 2. That is, suppose the current frame is numbered 0, the system extracts a bounding box at the same position from frames numbered -6, -4, -2, 0, 2, 4, and 6. The patch inside the bounding box on each frame is scaled to 60×40 pixels.

Figure 2:
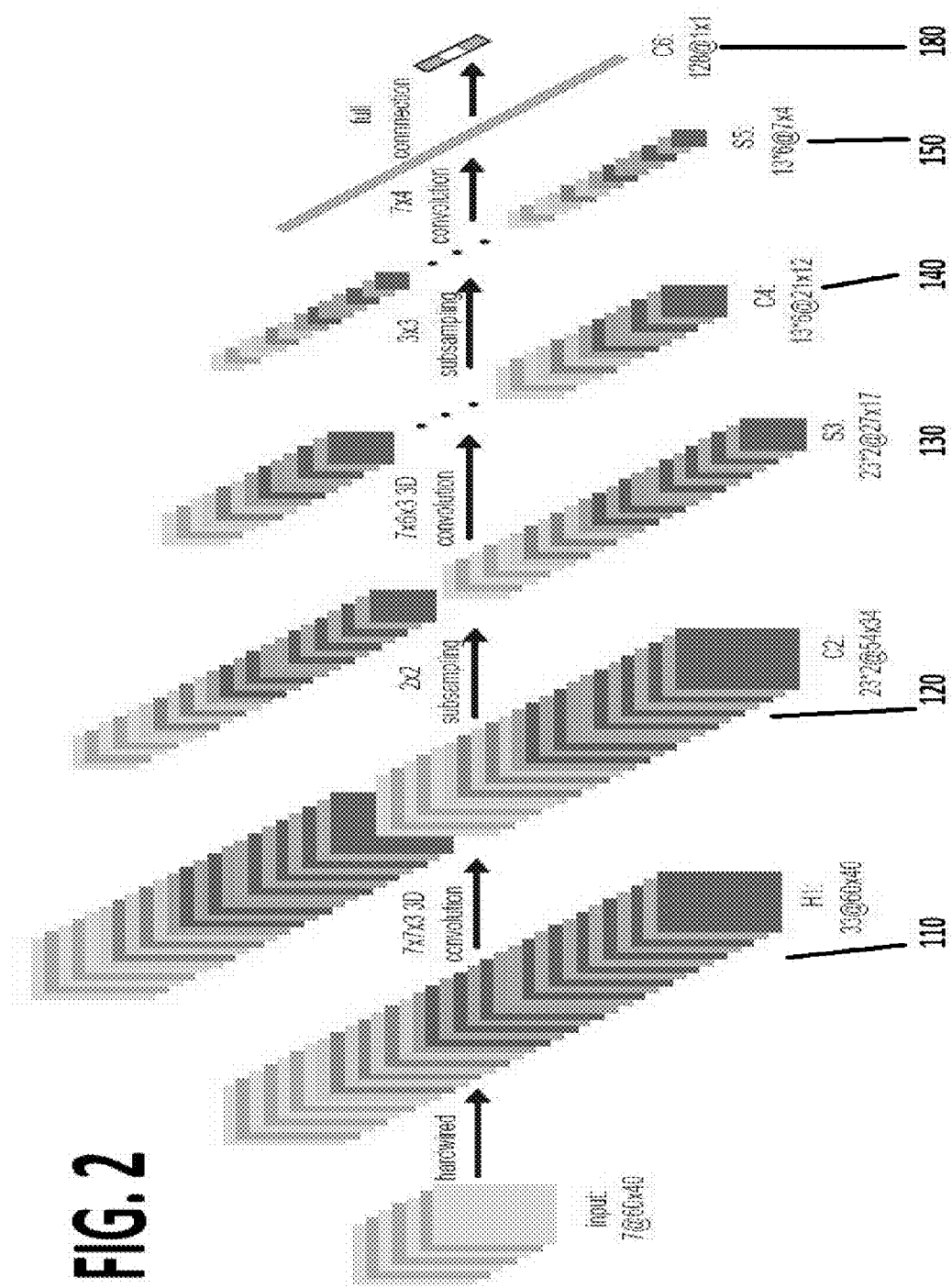
FIG. 2 shows an exemplary CNN architecture for action recognition.

FIG. 2 shows an exemplary 3D CNN architecture for action recognition. The 3D CNN architecture for human action recognition has a hardwired layer 110, convolution layers 120, 130 and 140, subsampling layers 150, and a full connection layer 180.

One implementation of the architecture of FIG. 2 considers 7 frames of size 60×40 centered on the current frame as inputs to the 3D CNN model. A set of hardwired kernels 110 is applied to generate multiple channels of information from the input frames. This results in 33 feature maps in the second layer in 5 different channels known as gray, gradient-x, gradient-y, optflow-x, and optflow-y. The gray channel contains the gray pixel values of the 7 input frames. The feature maps in the gradient-x and gradient-y channels are obtained by computing gradients along the horizontal and vertical directions, respectively, on each of the 7 input frames, and the optflow-x and optflow-y channels contain the optical flow fields, along the horizontal and vertical directions, respectively, computed from adjacent input frames. This hardwired layer 110 is used to encode prior knowledge on features, and this scheme usually leads to better performance as compared to random initialization.

3D convolutions are applied with a kernel size of 7×7×3 (7×7 in the spatial dimension and 3 in the temporal dimension) on each of the 5 channels separately. To increase the number of feature maps, two sets of different convolutions are applied at each location, resulting in 2 sets of feature maps in the C2 layer each consisting of 23 feature maps. This layer contains 1,480 trainable parameters. In the subsequent subsampling layer S3, 2×2 subsampling is used on each of the feature maps in the C2 layer, which leads to the same number of feature maps with reduced spatial resolution. The number of trainable parameters in this layer is 92. The next convolution layer C4 is obtained by applying 3D convolution with a kernel size of 7×6×3 on each of the 5 channels in the two sets of feature maps separately. To increase the number of feature maps, 3 convolutions are applied with different kernels at each location, leading to 6 distinct sets of feature maps in the C4 layer each containing 13 feature maps. This layer contains 3,810 trainable parameters. The next layer S5 is obtained by applying 3×3 subsampling on each feature maps in the C4 layer, which leads to the same number of feature maps with reduced spatial resolution. The number of trainable parameters in this layer is 156. At this stage, the size of the temporal dimension is already relatively small (3 for gray, gradient-x, gradient-y and 2 for optflow-x and optflow-y), so convolution is done only in the spatial dimension at this layer. The size of the convolution kernel used is 7×4 so that the sizes of the output feature maps are reduced to 1×1. The C6 layer consists of 128 feature maps of size 1×1, and each of them is connected to all the 78 feature maps in the S5 layer, leading to 289,536 trainable parameters.

By the multiple layers of convolution and subsampling, the 7 input frames have been converted into a 128D feature vector capturing the motion information in the input frames. The output layer consists of the same number of units as the number of actions, and each unit is fully connected to each of the 128 units in the C6 layer. The design essentially applies a linear classifier on the 128D feature vector for action classification. For an action recognition problem with 3 classes, the number of trainable parameters at the output layer is 384. The total number of trainable parameters in this 3D CNN model is 295,458, and all of them are initialized randomly and trained by online error back-propagation algorithm.

The foregoing 3D CNN model for action recognition constructs features from both spatial and temporal dimensions by performing 3D convolutions. The developed deep architecture generates multiple channels of information from adjacent input frames and performs convolution and subsampling separately in each channel. The final feature representation is computed by combining information from all channels. The 3D CNN model has been evaluated using the TRECVID and the KTH data sets. Results show that the 3D CNN model outperforms conventional methods on the TRECVID data, while it achieves competitive performance on the KTH data, demonstrating its superior performance in real-world environments. 3D CNN model on the TREC Video Retrieval Evaluation (TRECVID) data, which consist of surveillance video data recorded in London Gatwick Airport. A multi-module event detection system, which includes 3D CNN as a module has been used in three tasks of the TRECVID 2009 Evaluation for Surveillance Event Detection and the system achieves the best performance on all three participated tasks.

Although CNN has been described herein for action recognition, other architectures, such as the deep belief networks are contemplated to achieve promising performance on object recognition tasks. The inventors contemplate that the model can be pre-trained using unsupervised algorithms to reduce the need for labeled training samples.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 3:
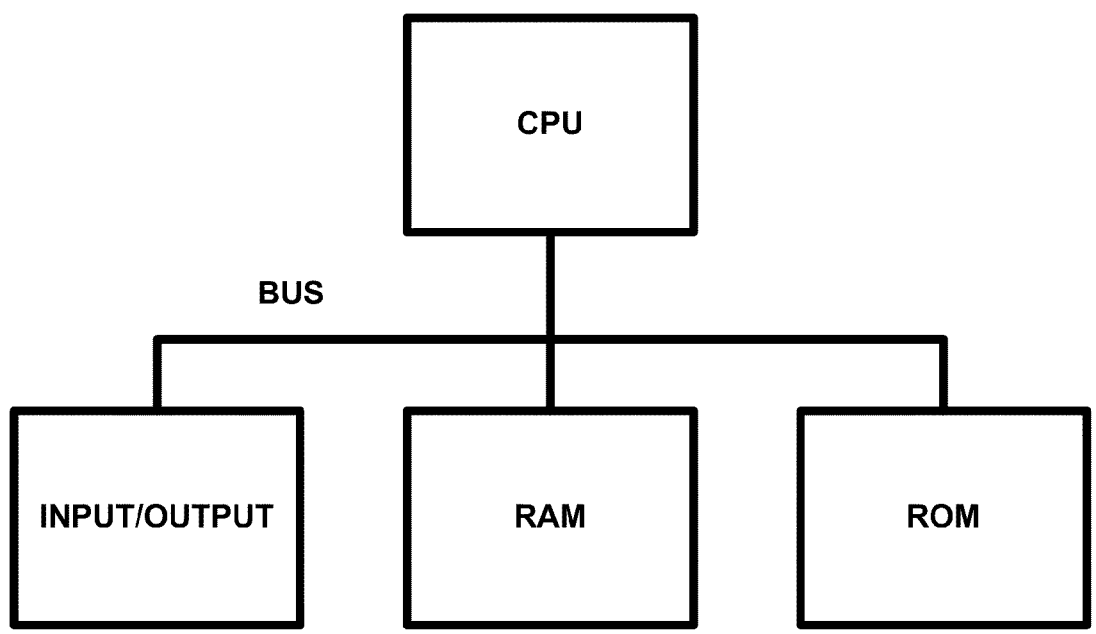
FIG. 3 shows an exemplary computer system running the 3D CNN.

By way of example, a computer to support the 3D CNN is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer implemented method to automatically recognize human actions from one or more video frames, comprising:
performing 3D convolutions to capture motion information encoded in multiple adjacent frames and extracting features from spatial and temporal dimensions therefrom;
generating multiple channels of information from the video frames,
combining information from all channels to obtain a feature representation for a three dimensional convolution neural network (3D CNN) model including determining a value v at position (x, y, z) on a j th feature map in an i th layer of the 3D CNN as:

$$v_{ij}^{xyz} = \tanh\left(b_{ij} + \sum_m \sum_{p=0}^{P_i-1} \sum_{q=0}^{Q_i-1} \sum_{r=0}^{R_i-1} w_{ijm}^{pqr} v_{(i-1)m}^{(x+p)(y+q)(z+r)}\right),$$

where tanh(•) is the hyperbolic tangent function, $P_i$ and $Q_i$ are height and width of a 3D kernel, $R_i$ is the size of the 3D kernel along a temporal dimension, $w_{ijm}^{pqr}$ is the (p, q, r) th value of the kernel connected to the m th feature map in a previous layer, and $b_{ij}$ is a feature map bias; and
applying the 3D CNN model to recognize human actions.

2. The method of claim 1, comprising detecting humans in the video frames.

3. The method of claim 1, comprising tracking humans in the video frames.

4. The method of claim 1, comprising generating multi-frame cubes from tracked humans.

5. The method of claim 4, wherein the multiple frames cubes are obtained by extracting bounding boxes at a predetermined position from consecutive frames before and after a current frame, leading to a cube containing an action.

6. The method of claim 1, wherein the 3D CNN comprises a hardwired layer, convolution layers, subsampling layers, and a full connection layer.

7. The method of claim 6, wherein the hardwired layer comprises kernels to generate the multiple channels of information from the video frame with feature maps in gray, horizontal gradient, vertical gradient, and optical flow gradients along horizontal and vertical directions, computed from adjacent video frames.

8. The method of claim 1, comprising generating a feature vector capturing motion information in the input frames.

9. The method of claim 8, comprising applying a linear classifier on the feature vector for action classification.

10. A system to automatically recognize human actions, comprising;
means for performing 3D convolutions to capture motion information encoded in multiple adjacent frames and extracting features from spatial and temporal dimensions therefrom;
means for generating multiple channels of information from the video frames,
means for combining information from all channels to obtain a feature representation for a three dimensional convolution neural network (3D CNN) model including determining a value v at position (x, y, z) on a j th feature map in an i th layer as:

$$v_{ij}^{xyz} = \tanh\left(b_{ij} + \sum_{m} \sum_{p=0}^{P_i-1} \sum_{q=0}^{Q_i-1} \sum_{r=0}^{R_i-1} w_{ijm}^{pqr} v_{(i-1)m}^{(x+p)(y+q)(z+r)}\right),$$

where tanh(•) is the hyperbolic tangent function, $P_i$ and $Q_i$ are height and width of a 3D kernel, $R_i$ is the size of the 3D kernel along a temporal dimension, $w_{ijm}^{pqr}$ is the (p, q, r) th value of the kernel connected to the m th feature map in a previous layer, and $b_{ij}$ is a feature map bias; and means for applying the 3D CNN model to recognize human actions.

11. The system of claim 10, comprising a human detector coupled to the video frames.

12. The system of claim 10, comprising a human tracker coupled to the video frames.

13. The system of claim 10, comprising means for generating multi-frame cubes from tracked humans.

14. The system of claim 13, wherein the multiple frames cubes are obtained by extracting bounding boxes at a predetermined position from consecutive frames before and after a current frame, leading to a cube containing an action.

15. The system of claim 10, wherein the 3D CNN comprises a hardwired layer, convolution layers, subsampling layers, and a full connection layer.

16. The system of claim 15, wherein the hardwired layer comprises kernels to generate the multiple channels of information from the video frame with feature maps in gray, horizontal gradient, vertical gradient, and optical flow gradients along horizontal and vertical directions, computed from adjacent video frames.

17. The system of claim 10, comprising means for generating a feature vector capturing motion information in the input frames.

18. The system of claim 17, comprising means for applying a linear classifier on the feature vector for action classification.

* * * * *